United States Patent [19]
Bachman et al.

[11] Patent Number: 5,907,621
[45] Date of Patent: May 25, 1999

[54] SYSTEM AND METHOD FOR SESSION MANAGEMENT

[75] Inventors: Margaret A. Bachman, Charlotte; Brian D. Jessup; Timidthy Sanford McKnight, both of Huntersville; Don Cameron Shoff, Hrrisburg, all of N.C.

[73] Assignee: International Business Machines Corporation, Armonk, N.Y.

[21] Appl. No.: 08/749,680

[22] Filed: Nov. 15, 1996

[51] Int. Cl.⁶ .................................................. H04K 1/00
[52] U.S. Cl. .................... 380/25; 380/49; 395/200.33; 395/200.59; 395/187.01
[58] Field of Search .............................. 380/25, 49, 24; 395/186–188.01, 200.59, 200.48, 200.33, 200.49; 705/26, 27

[56] References Cited

U.S. PATENT DOCUMENTS

| | | | |
|---|---|---|---|
| 5,434,918 | 7/1995 | Kung et al. ............................... | 380/25 |
| 5,542,046 | 7/1996 | Carlson et al. ........................... | 395/186 |
| 5,684,951 | 11/1997 | Goldman et al. ...................... | 395/188.01 |
| 5,708,780 | 1/1998 | Levergood et al. ................... | 395/200.12 |

OTHER PUBLICATIONS

David M. Kristol and Lou Montulli "Proposed HTTP State Management Mechanism", 16 Feb. 1996.
Neil Randall "The New Cookie Monster", PC Magazine 22 Apr. 1997.

*Primary Examiner*—Gail O. Hayes
*Assistant Examiner*—Pinchus M. Laufer
*Attorney, Agent, or Firm*—K. O. Hesse

[57] ABSTRACT

Apparatus and method is disclosed for providing user session continuity over several transactions being conducted on the internet. A secure token is made part of each HTML page sent to a user from the server computer and the token is returned to the server with each submitted transaction request. The token is compared with token information originally sent out. The submitted request is recognized as being from an authorized user if the token and a session table have the same information.

15 Claims, 7 Drawing Sheets

FIG. 5

```
<TITLE>
First Internet Bank of CyberSpace - Account Summary
</TITLE>
</HEAD>
<BODY onLoad="timeoutID=setTimeout('timeoutAlert()', 150000)" background=/icons/back1.jpg>
<CENTER>
<P><B>[ 
    <A HREF="/cgi-bin/ifsewwwc/ifsewwwc?Logoff&token=0101DDA110050B08&nls=EN">Home</A>   501
     | 
    <A HREF="cgi-bin/ifsewwwc/ifsewwwc?Transfer&token=0101DDA110050B08&nls=EN">Transfer Funds</A>  |    503
    <A HREF="cgi-bin/ifsewwwc/if sewwwc?Services&token=0101DDA110050B08&nls=EN">Customer Service</A>.. |    505
    <A HREF="/cgi-bin/ifsewwwc/ifsewwwc?Menu&help=AccountSummaryHelp.html&token=0101DDA110050B08&nls=EN">Help</A>  |    507
    <A HREF="/cgi-bin/ifsewwwc/ifsewwwc?General&help=Menu.menu&token=0101DDA110050B08&nls=EN">General Help</A>  |    509
    <A HREF="/cgi-bin/ifsewwwc/ifsewwwc?Logoff&token=0101DDA110050B08&nls=EN">Exit</A>   511
>
 ]</B>
</CENTER>
```

FIG. 6

[ Home | Transfer Funds | Customer Service.. | Help | General Help | Exit ]

ACCOUNT SUMMARY as of Thu, 17 Oct 1996 13:49:34 EST:

| Number | Description | Nickname | Balance |
|--------|-------------|----------|---------|
| 234038 | Savings Account | Peter's Savings | $1,764.00 |
| 234021 | Savings Account | | $21,647.00 |
| 234081 | Checking Account | Marsha's Checking | $13,781.00 |
| 234093 | Checking Account | | $23,801.00 |
| 234081 | Auto Loan | | $17,505.00 |
| 234097 | Checking Account | Marsha's Checking | $2,286.00 |
| 234093 | Mortgage | Mike's Home Loan | $3,245.00 |
| 234058 | Money Manager | | $20,246.00 |
| 234063 | Checking Account | | $966.00 |
| 234088 | Checking Account | Jan's Checking | $18,075.00 |

SYSTEM AND METHOD FOR SESSION MANAGEMENT

BACKGROUND OF THE INVENTION

1. Field of the Invention

The present invention relates to server-oriented programmed apparatus and method for managing a user session on a network where user application connections are not maintained. More particularly, the present invention relates to a token validation apparatus and method that is transparent to the user and client application and is operable with any internet client.

2. Description of Related Art

One technique for conducting important transactions on a public network is to require that a user submit user identity information and a password with every page or form submitted to a server computer at an institution. This may be repetitive and tiresome to a user. Further, the more often that these important values are communicated, the more exposed they become to attack and therefore it is desirable to minimize the number of times that they must be entered and transmitted.

Another known technique for conducting important transactions on a public network includes securing the client or user terminal and encrypting all important messages. A difficulty with securing the client is that many of them are open architecture personal computers which, unlike an automatic teller machine, can not be secured. Further difficulty arises because new browser programs are being made available to the public all the time and a financial institution, for example, can not control the features of these programs beyond the basic standards already being observed. Most of these browser programs store pages in memory and allow scrolling back and forth. Many of these browser programs also allow a page or form received from a financial institution to be stored on disk for future reference. The existence of such pages on an unsecured personal computer, for example at a public library, may allow the next user to recover such information with minimal hacker knowledge and submit the page in a replay mode, pretending to be the authorized user. If the page has been stored on disk, it can be recovered at a later time even if the computer has been turned off.

The use of encryption as described in U.S. Pat. No. 5,416,842 is implemented in many server programs and client browser programs in the form of the secure socket layer (SSL). This method by itself does not provide secure session continuity at an unsecured. terminal over the sequential presentation and submission of a number of pages of a multi-page session as provided by the instant invention but only provides protection against those who would attack the communication network.

U.S. Pat. No. 5,237,614 describes a system based upon limiting access by a user to a client at a user location and then relies on encryption to protect the session and provide continuity over the series of pages presented to the user and submitted by the user. This system requires that specialized client software and hardware must be provided at each user location which the instant invention does not require.

The present invention overcomes these inadequacies, problems and disadvantages of the prior art by means of the apparatus and method of the invention which is summarized below.

SUMMARY OF THE INVENTION

An advantage of the present invention is that a secure user session can be established between an internet server and a browser at an unsecured client.

A further advantage of the invention is that no special hardware or software is required at a participating client in order for the method of the invention to perform satisfactorily.

A still further advantage is that the identity of a user is verified in each request submitted by the user, without the need for the user to resubmit identity information and a memorized password with each transaction request.

These and other advantages are obtained by the instant invention through the use of a unique token that is secure from counterfeit and replay attacks. The token is created by combining user identity information with random information and table address information in a way that has a high attack work factor so that it can effectively not be duplicated. To avoid distracting the user, the token is carried in a field of the page that is normally not displayed in the presentation space. Requests submitted by the user automatically include the token which is then compared at the server with the token previously sent out to the user. No steps of the method occur at the client or need be taken by the user making the method transparent to the user. The method and apparatus of the invention operate to complement the transmission security provided by the Secure Socket Layer (SSL) encryption on the internet with a secure user session.

BRIEF DESCRIPTION OF THE DRAWINGS

FIG. 5 shows a portion of a form page wherein the token has been exposed to view.

FIG. 6 shows a portion of a form page as it is displayed to the authorized user for transaction selection.

DESCRIPTION OF THE PREFERRED EMBODIMENT

Figure 1:
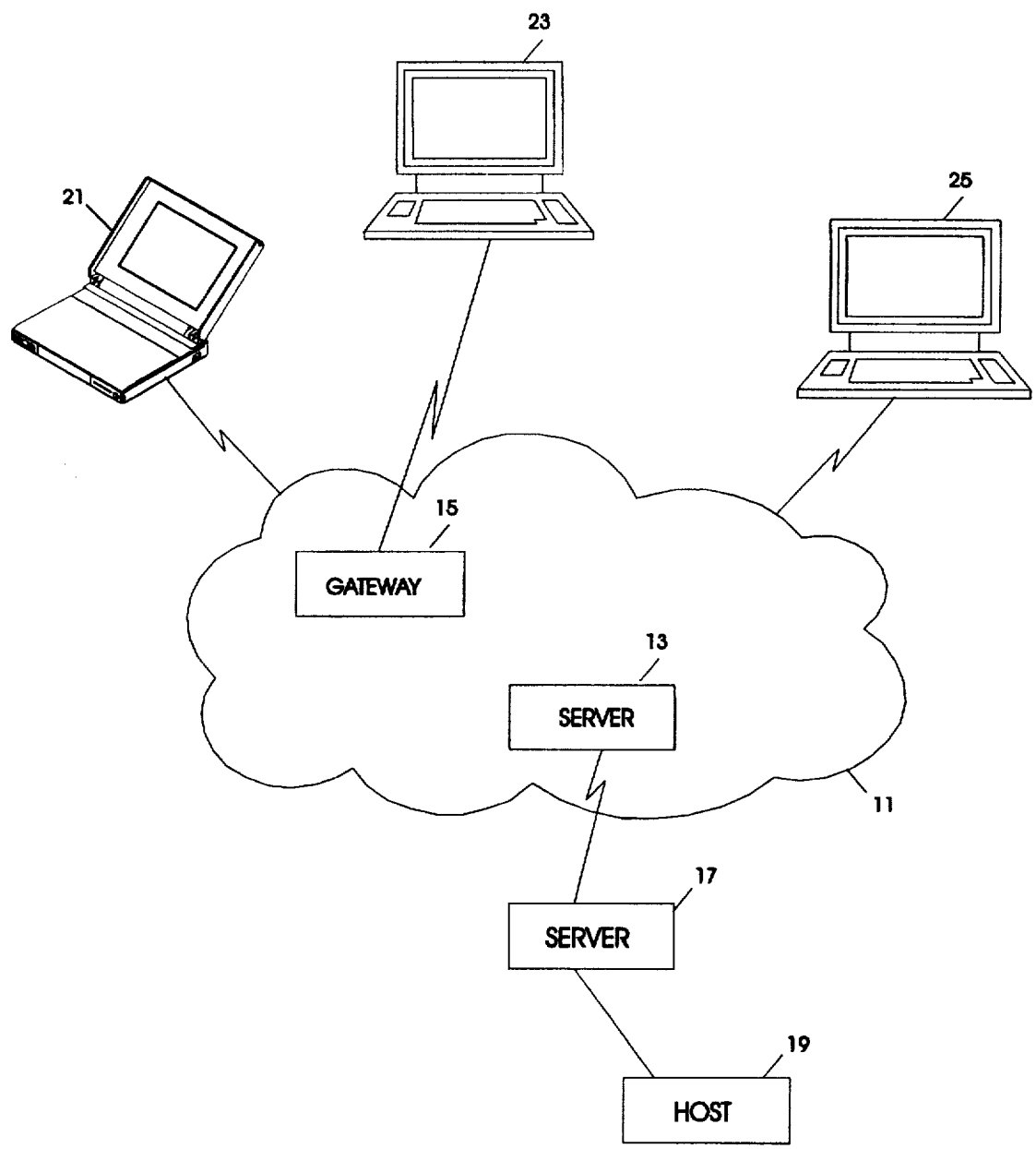
FIG. 1 is a high level diagram of the internet.

FIG. 1 portrays the overall environment wherein the invention finds utility. The cloud-like communication medium 11 is made up of communication lines and switches connecting servers like server 13 to gateways like gateway 15. Server 13 and gateway 15 provide the communication access to the world wide web internet. Server 13 may be connected to an application server 17 as shown or may be connected directly to a host computer 19 which is the record keeping computer of a financial institution providing transactions over the internet 11 with users located remotely at any of client Personal Computers 21, 23 or 25. Computer 21 may be a lap top computer connected temporarily to communication lines. Computer 23 may be a computer at a public library that is available to members of the library for use in preparing employment resumes and for accessing services and information via the internet 11. Computer 25 may be in a home environment and may be periodically connected via dial up to the internet.

End to end message security is provided for the internet 11 by a secure socket layer (SSL) encryption and decryption facility in each server program in 13 and each browser program in clients 21, 23 and 25. Thus there is little risk of attack by tapping the phone lines for example. There remains the risk of attack from the client itself after the SSL has provided decryption services. As will be described in greater detail with respect to FIG. 3 wherein a sample computer is shown, each HTML page is stored in the memory of a client to allow forward and backward scrolling. A page can optionally be stored to disk if the user desires. Accordingly pages containing tokens may be available at the client for access by hackers who wish to cause mischief.

Figure 2:
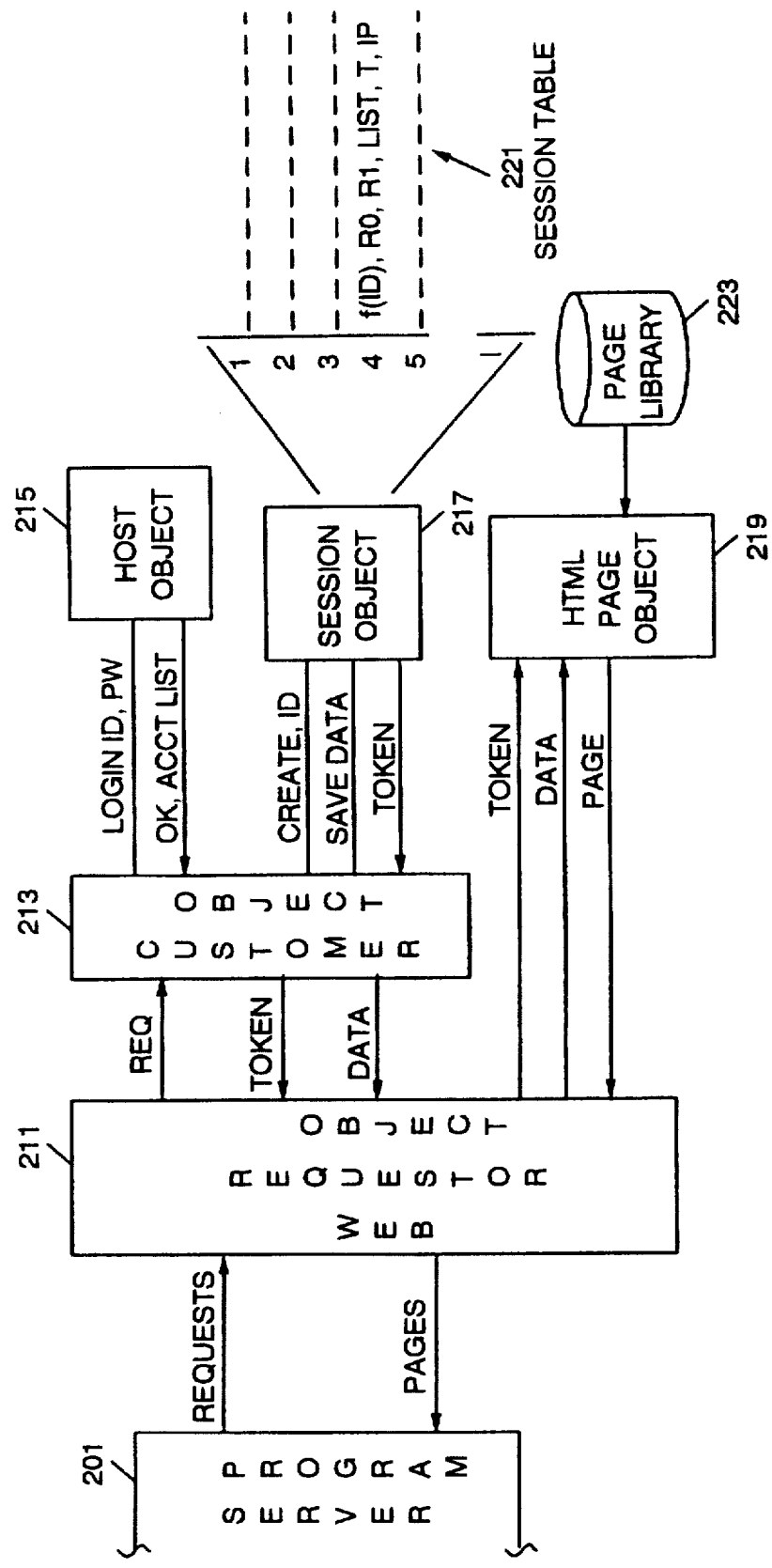
FIG. 2 is a block diagram showing the parts of the invention.

FIG. 2 is a block diagram showing a Common Gateway Interface (CGI) program having a number of routines in the form of programmed objects which make up a preferred embodiment of the invention to thwart the above described risks. Web Requestor object 211 runs in server 17 and receives requests and data from a server program 201 such as for example the National Center for Supercomputing Activities (NCSA) server program.

The object 211 also sends pages of data to the server program for communication to the client 23, for example. An example request and data may be a login with user identification and password from a user at client 23 who wishes to transfer funds from a savings account to a demand deposit account in order to cover purchases about to be made with a cash card.

Object 211 receives the login request and passes it to the customer object 213 which passes it to the host object 215. The host object 215 passes the user identification and password to host 19 and receives a OK/NOT OK depending upon the correspondence of the password to the user identity information. If the password and identity information correspond, the user is an authorized user and the host 19 also returns an account list and other practical information that can be used by the HTML page object 219 to format a menu page or form to be sent to the authorized user. The user identity information is passed to the session object 217 which sets up a session by generating a session token from a hash of the identity information, from an index and from random numbers R0 and R1. R0 is the primary random number for this session and will not change during the existence of the session. R1 is a transaction random number and it changes every time a new token is generated so that tokens are modified during this session in order to provide randomness and prevent token replay. The identity information, random information R0, R1 and other information such as an account list and the page transmission time T are stored in a session table 221 at the index entry I used to create the token. In an alternate embodiment, to be explained later in greater detail, an Internet Protocol (IP) address is also stored in the session table index entry.

The token is then returned to the customer object 213 and the web requestor object 211 which sends the token and pertinent account data to the HTML page object 219 for layout of a page. The page object 219 retrieves a page template from the page library 223 and inserts the pertinent account information preparatory to sending the page to the authorized user at client 23. The token is placed into a field that is normally not displayed to a user to avoid the distraction that the token would create in the mind of the user. The token is also placed in each hypertext link in the page. Thus whenever a request is submitted, it will include a token. It is recognized that in an open architecture client, all information is accessible with some knowledge and effort, therefore the security of the token does not rely on being hidden from the user. Instead, it is encrypted. Thus there is, for practical purposes, no way that the user or another person with access to the client can tamper with the token undetected. FIG. 5 shows a portion of HTML source for a menu page with a number of hypertext links 501 through 511 for submission back to the server 17. Each submission format will include the token.

The web requestor object 211 then passes the formatted page to the server program 201 for transmission to the gateway 15 and client 23 where it is displayed to the authorized user. The authorized user, at the client, peruses the page and provides input by selecting a link item or entering information and returns at least a portion of the page to server 17.

While the user is perusing the page, the session object periodically scans the content of the index entries comparing the current time with the time T stored in each index entry. If the difference between the current time t and the stored time T exceeds a predetermined amount M, such as for example four minutes, the data at the index entry is erased on the ground that the session has timed out.

At server 17, a newly submitted request is processed by extracting the token, and decrypting it in the session object 217. The session uses the index I content of the token to access data stored in the session table 221 at index entry 4, for example, in FIG. 2 for comparison with the remaining token content. If the comparison indicates that the stored data and the remaining content are equal, the submission is recognized as being from an authorized user. The other portions of the submission are then processed and request information is forwarded to host 19 for action.

While host processing is in progress, the session object changes the transaction random number R1 and generates a new token in preparation for sending transaction result information to the authorized user.

In the event that the comparison indicates that the stored data and the remaining content are unequal or the stored data has been erased, the submission is recognized as being from an unauthorized user or a user whose session has expired. The other portions of the submission are then processed and with the page library 223, used to create a login request page to be sent to the user.

In another embodiment of the invention, the IP address of the client used to send the login request is made part the session table entry. Thereafter this stored IP address is compared with the IP address from which any submission is received. If the IP address from which a submission was received is different from the IP address in the table, even if the token is otherwise found to be valid, the submission is not considered to be part of a valid session. This further embodiment provides another level of session security without adding significant processing overhead.

Figure 3:
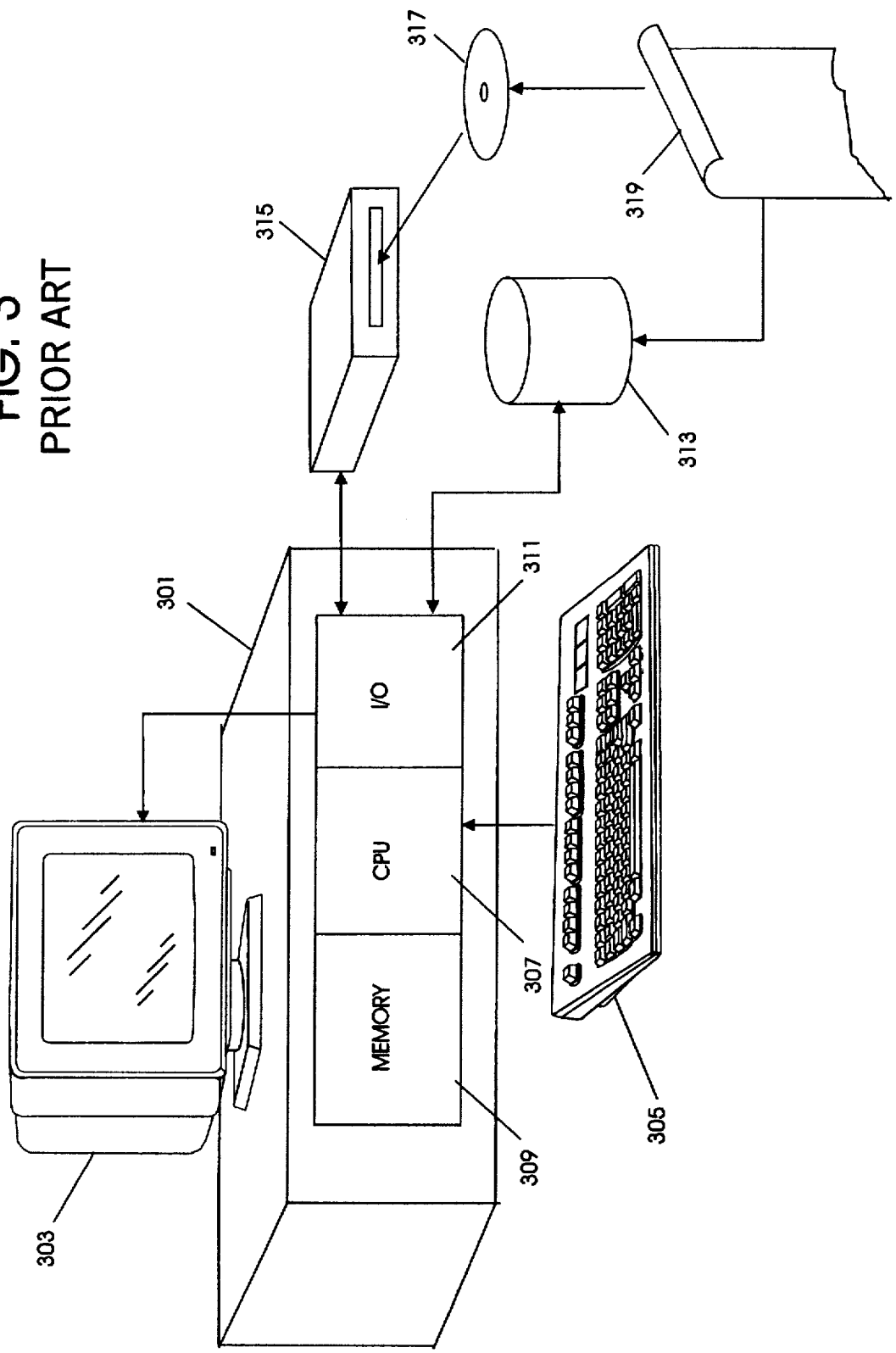
FIG. 3 is a block diagram of a computer which may be used in carrying out the method and implementing the apparatus of the invention.

FIG. 3 shows an example computer that may be used in clients 21, 23 and 25 as well as at gateway 15 and servers 13 and 17. Personal computer clients typically require less extensive resources and less powerful processors than are required by gateway and server computers, but in other respects they are very similar.

The computer comprises the main case 301, a display 303 and a keyboard 305. Inside of case 301 is found, random access and read only memory 309, a central processing unit 307 and input output (I/O) circuits 311. The I/O circuits are controlled by programs to in turn control the keyboard 305, display 303 and mass storage in the form of a fixed disk media 313 and a removable disk unit 315. The unit 315 may be a magnetic diskette unit or a compact optical disk unit. Disk media 317 is removably insertable into unit 315. Various browser programs and or server programs including the program 319 in which the instant invention is embodied may be written onto disk media 313 and/or diskette media 317 from which it is loaded into memory 309 to control the computer in accordance with the teachings and method of the invention. It will be recognized that media is not limited to storage media but may also be a communication media that carries the program of the instant invention to a server computer like the computer of FIG. 3.

At a client personal computer, each page received from a server is stored in memory 309 of a client to allow forward and backward scrolling. A page can optionally be stored to disk 313 if the user desires. Accordingly pages containing tokens in accordance with the instant invention will be available at the client for access by those who wish to cause mischief. It is for this reason that it is important that there be no need to perform any operations such as decryption or interpretation upon the token at the browser or client. All of the unique apparatus if the invention is located at a server and can interact with any browser observing current Hypertext Transfer Protocol (HTTP) standards.

OPERATION OF THE INVENTION

Figure 4:
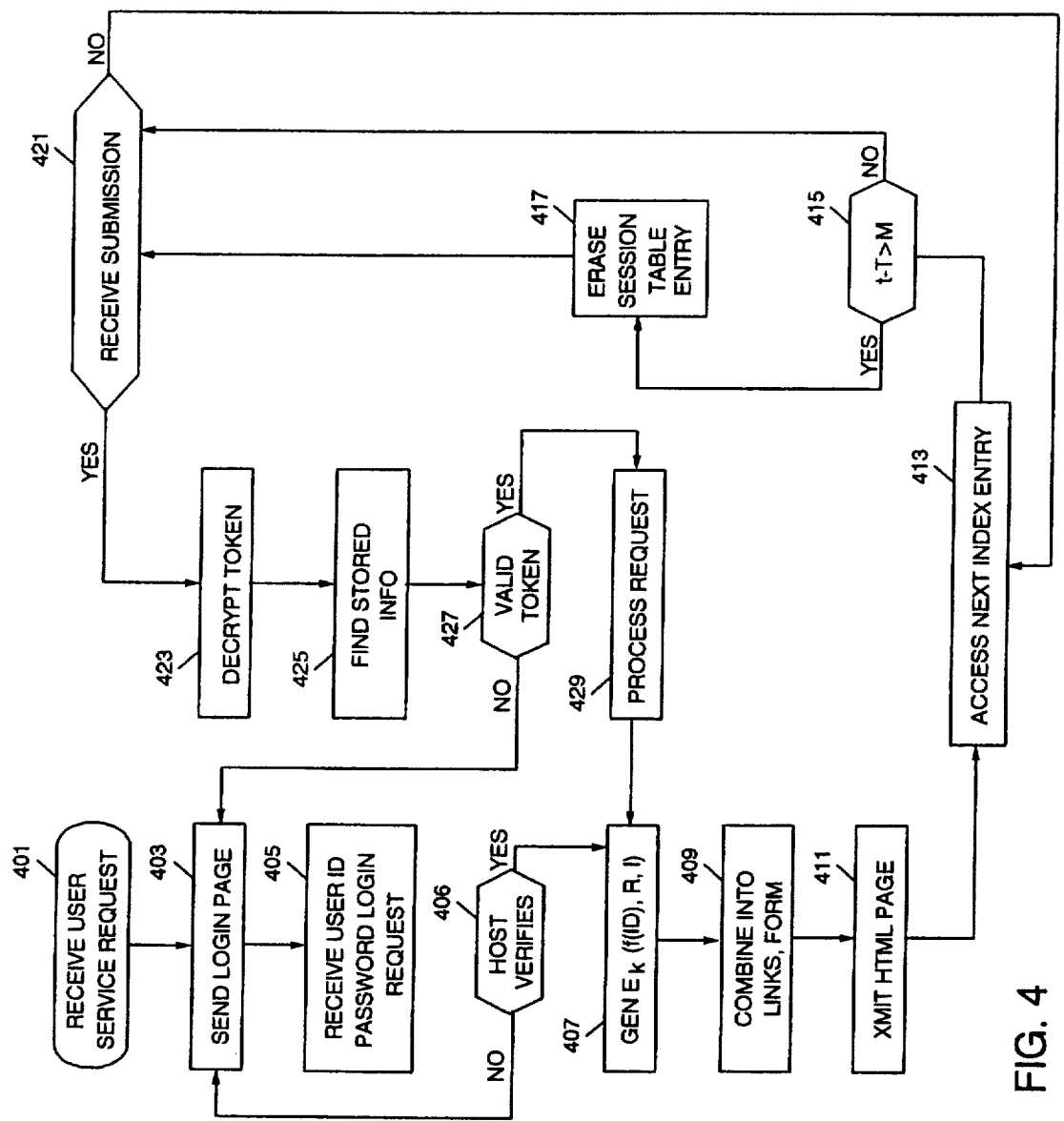
FIG. 4 is a flow diagram showing the method of the invention.

Referring now to the flow diagram in FIG. 4, the operation of the invention at a server 17 will be described. At block 401, the server 17 receives a request for service from an internet user. In response to this request, the server sends, at block 403, a login page to the user. The user enters identity information such as a user ID and a memorized password that can be used to verify that the person who remembered the password is an authorized user. The user then submits the login page at block 405. At block 406, the host 19 has verified correspondence between the ID and password and at block 407, the session object 217 generates a token as described earlier with respect to FIG. 2.

The token can be represented by the expression:

$$E_k(f(ID),R,I)$$

where E subscript k is the encryption using the encryption key k of the argument value in the parentheses. f(ID) is a function such as a hash function of the users identity information. R is a random number and I is the index to an entry in the session table 221. It will be recognized that the items in the parentheses of the above expression are not crucial to the invention but that other values serving equivalent functions can be substituted therein. For example the token must exhibit randomness to avoid predictability and therefore any value that exhibits a form of randomness may be substituted for the value R. In one embodiment, a session random number R0 and a transaction random number R1 are placed in the parentheses. R1 is changed for each page but R0 remains the same until the session ends. By comparing only R0 to the corresponding R0 stored in the session table at index I, earlier pages can be used by a user to send in requests. If it is desired to limit requests to those from the latest page, both R0 and R1 are compared with corresponding stored values to limit an incoming submitted token to the latest token. The token is generated by first combining the values of the variables in the parentheses into a multi-byte field which is then encrypted using an algorithm such as the DES algorithm. In addition, the values of the variables used to generate the token and the then current time T, are stored in the session table at the index location. In one alternate embodiment, an internet protocol (IP) address is also included in the session table entry. The inclusion of the IP address allows a valid token coming from a different address to be recognized as possibly being used by an un-authorized user.

The token is combined at block 409 into an HTML page by being placed into a hidden or other normally non-displayed field of a page by the HTML page object shown in FIG. 2.

At block 411 the formatted HTML page is transmitted over the internet to the user where it is displayed, soliciting input of transaction selections such as Transfer Funds, Customer Service or other transaction. The token is not displayed in normal operation but exists in each hypertext link on the page. For example, as shown in FIG. 5, "token=0101DDA110050B08" appears in hypertext links 501, 503, 505, 507, 509 and 511 but the tokens do not appear in the display of these options in FIG. 6.

While awaiting the submission of requests in response to outstanding pages, the session object scans the entries in the session table as in block 413 and compares the time T stored in each entry with the now current time t at block 415. If the current time t is much later by a predetermined amount M than the stored time T, the session is considered to have timed out and the data in the entry is erased as depicted in block 417. Such removal of expired sessions from the session table continues until the next submission is received at block 421.

When the authorized user makes a selection, the request is submitted to the server at block 421, retaining therein the token originally sent out in the HTML page. At the server, the server program passes the submission through to the session object where the token is decrypted at block 423 to expose a multi-byte field of token information including an index. The index is used to access the stored token information at block 425. The stored token information is compared at block 427 with the received token information and the request is honored only if the stored and received token information are equal to each other indicating that the received token is a valid unexpired token. Although the index portion of the token information is not itself stored in the session table, the index is used to access the session table and therefore, if the index is not the same as was sent in an outgoing token, an incorrect session table entry will be accessed and it will not compare equal to the remainder of the decrypted token.

If the token is found to be valid at block 427, the transaction is forwarded to the host object for processing at block 429 and a new token is generated at block 407 to be sent to the authorized user with the response page at block 409.

If the token is found to be invalid, or in the alternate embodiment of block 431, if the token was received from an IP address other than stored in the session table, the request is not processed but a login menu is sent to the user at block 403 so as to determine if the user is an authorized user as was previously described with respect to these blocks 403 and 405.

During a session, multiple pages will be in existence at a client. In some instances, a user may make a selection from a much earlier page. Each page contains a token that is generated from the same session table entry but each token is further randomized by including another random number R1 in the value encrypted. In the preferred embodiment, R1 is not made part of the comparison to validate the token. Therefore a user need not submit requests only from the latest page.

Figure 7:
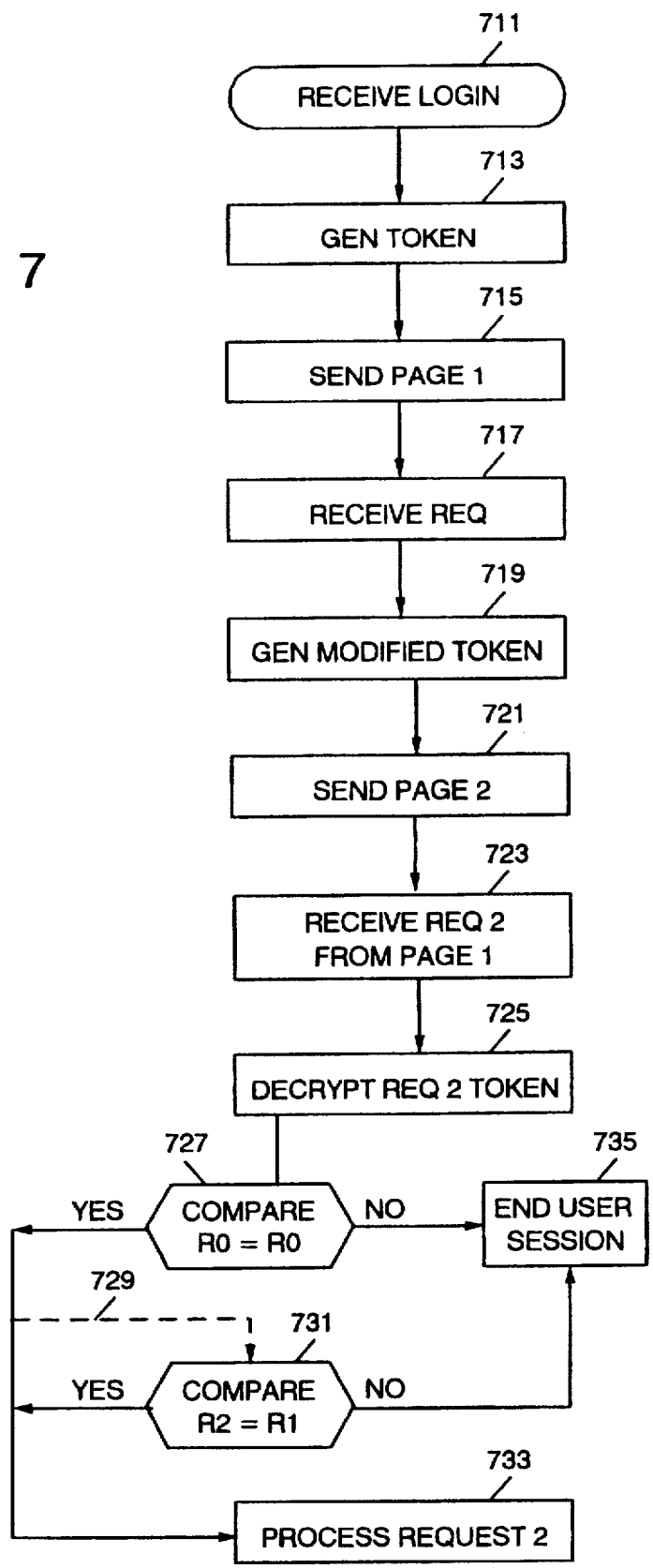
FIG. 7 shows a flow diagram of an alternate session method according to the invention.

This operation is shown more clearly in FIG. 7 where a session login is received at block 711 and a token is generated at block 713 using an R0 and an R1. It is sent in a page one at block 715 and received in a request at block 717. Assuming the returned token is the same as the generated token, a modified token is generated at block 719 using R0 and a new transaction random number R2. It is sent in page two at block 721. A request two is received but it may have been a link from page one. The request two token is decrypted and the session random number R0 is compared at block 727 to the R0 stored in the session table as describer earlier. If it is desired to limit requests to those linked from the latest page, that is page two, then path 729 is followed and the compare of R1 with R2 is made at block 731. The session is ended at block 735 because an old page was used. In the alternative, if the user is allowed to use earlier pages, block 731 is bypassed and request two is processed at block 733 because the session random number R0 was the same as stored in the session table at index I.

Of course, many additional modifications and adaptations to the present invention could be made in both embodiment and application without departing from the spirit of this invention. For example, although an object oriented programmed server computer is the current preferred embodiment, a fixed embodiment or an alternate programming architecture may be used. Likewise other encrypting algorithms may be chosen to protect the token from reverse engineering at an unsecured client. Accordingly, this description should be considered as merely illustrative of the principles of the present invention and not in limitation thereof.

We claim:

1. Method of managing a user session on a network comprising the steps:

A) receiving at a server, user-unique information from a user at a client;

B) generating at said server, from said user-unique information, a session token;

C) storing said session token at said server;

D) combining said session token into a first page;

E) transmitting said first page to said client for display to said user and for input from said user;

F) receiving a first submitted request at said server;

G) comparing a submitted session token from said first submitted request with said session token at said server to identify said first submitted request as being from said user;

H) processing said submitted request and preparing a second page;

I) generating from said user unique information, a modified token;

J) storing said modified token at said server;

K) combining said modified token into said second page;

L) transmitting said second page to said client for display to said user and for input from said user;

M) receiving a second submitted request at said server;

N) comparing a second submitted token from said second submitted request with said modified token at said server to identify said second submitted request as being from said user in a same session as said first page and said first submitted request.

2. The method of claim 1 wherein said step B) further comprises the steps:

assembling an argument including at least part of said user-unique information and session random information;

encrypting said argument to create said session token; and wherein said step I) further comprises the steps:

assembling another argument including at least part of said user-unique information, said session random information and second random information;

encrypting said another argument to create said modified token.

3. The method of claim 2 wherein said comparing step N) further comprises the steps:

retrieving said second submitted session token from said second submitted request;

decrypting said second submitted token to retrieve a submitted argument;

comparing said submitted argument with said another argument;

determining that said second submitted request is from said user if session random information in said submitted argument is equal to session random information in said another argument at said server.

4. The method of claim 3 wherein said arguments comprise:

said user-unique information, said session random information and index information, said index information being an index into a session table where said user-unique information and said session random information is stored at said server, said tokens being generated by encrypting a concatenation of said at least part of said user-unique information, said session random information and said index information.

5. The method of claim 2 wherein each of said arguments comprise:

a hash of said user-unique information, said session random information and index information, said index information being an index into a session table where said user-unique information and session random information is stored at said server.

6. The method of claim 5 wherein each of said tokens is generated from a same session table entry and a time of transmission is stored with each entry in said session table.

7. The method of claim 6 further comprising the steps:

processing a submitted form and preparing a third page;

changing said second random information in said session table entry;

generating from said session table entry, a third token;

combining said third token into said third page;

transmitting said third page to said client for display to said user and for input from said user;

receiving a submitted form at said server node;

comparing a submitted session token from said submitted form with said session token at said server node to identify said submitted form as being one of said first page, said second page and said third page from said user in the same session as said first page, said second page and said third page.

8. The method of claim 6 further comprising the steps:

comparing a current time with a time stored with said session table entry at said server;

erasing said stored session table entry when a difference between said current time and said time stored with said session table entry exceeds a predetermined time.

9. The method of claim 8 further comprising the steps:

sending, upon receipt from said user of a request which is from a page for which a session table entry is not found, a page soliciting resubmission of said user-unique information;

generating from said user-unique information, another session token;

combining said another session token into said page for which a session table entry was not found;

transmitting said page for which a session table entry was not found to said client for display to said user and for input from said user.

10. A computer program product for use in a data processing system, the computer program product comprising:

a computer useable medium having computer readable program code embodied therein for managing a user session, said computer program product including:

generating means for responding at a server to user-unique information from a user at a client and generating from said user-unique information, a session token;

means for combining said session token into portions of a first page;

means for transmitting said first page to said client for display to said user and for input from said user;

means for receiving a first submitted request at said server;

means for comparing a submitted session token from said first submitted request with said session token at said server to identify said first submitted request as being from said user;

means for processing said first submitted request and preparing a second page;

means for generating a modified token from said session token by including a transaction random number in said token;

means for combining said modified token into said second page;

means for transmitting said second page to said client for display to said user and for input from said user;

means for receiving a second submitted request at said server;

means for comparing a submitted session token from said second submitted request with said modified token at said server to identify said second submitted request as being from said user in a same session as said first page and said first submitted request.

11. The computer program product of claim 10 wherein said means for comparing further comprises:

means for retrieving a submitted session token from a submitted request;

means for decrypting said submitted token to retrieve a submitted argument;

means for comparing said submitted argument;

means for determining that said submitted request is from said user in a current session if a submitted session random number in said submitted argument is equal to a session random number in an argument from which tokens are being generated for said current session at said server.

12. The computer program product of claim 10 further comprising:

means for processing a submitted request and preparing a subsequent page;

means for generating a modified token from said argument by including a transaction random number in said token;

means for combining said modified token into a subsequent page;

means for transmitting said second page to said client for display to said user and for input from said user;

means for receiving a subsequent submitted request at said server;

means for decrypting a submitted token from said second submitted request to retrieve a submitted argument;

means for comparing said second submitted argument with said argument at said server to identify said submitted request as being from said user in a same session as said page and an earlier submitted request.

13. A server data processing system for managing a session with a client data processing system comprising:

means for generating a taken from token arguments, said token arguments including user-unique information, a session random number and a page random number, said page random number being different for each page causing said token to be different for each page;

means for transmitting said token to said client data processing system as part of each page;

means for storing at said server data processing system, said token arguments and a time of transmission of a page;

means for comparing a session random number, from a submitted token received at said server data processing system in a submitted request from a client data processing system, with a session random number stored at said server data processing system, said submitted token being a token from any of said each page;

means for determining that said submitted request is part of an existing session when said submitted session random number compares equal to said session random number stored at said server data processing system.

14. The server of claim 13 further comprising:

means for periodically testing said time stored with said token arguments and removing said stored token arguments from storage at said server data processing system when a difference between a current time and said time stored with said stored token arguments exceeds a predetermined value.

15. The server of claim 14 further comprising:

session table means for storing said token arguments, said token arguments further including index information;

said means for comparing further comprising means for using index information, from a submitted token received at said server data processing system in a submitted request from a client data processing system, to address an entry in said session table means and retrieve stored token arguments when said stored token arguments have not been removed by said means for periodically testing.

* * * * *